United States Patent
Weems

(10) Patent No.: US 10,814,168 B2
(45) Date of Patent: Oct. 27, 2020

(54) PITCHER STATISTICS TRACKING AND MONITORING SYSTEM

(71) Applicant: PitchKount, LLC, Broxton, GA (US)

(72) Inventor: Jeffrey P. Weems, Broxton, GA (US)

(73) Assignee: PitchKount, LLC, Broxton, GA (US)

( * ) Notice: Subject to any disclaimer, the term of this patent is extended or adjusted under 35 U.S.C. 154(b) by 127 days.

(21) Appl. No.: 16/025,350

(22) Filed: Jul. 2, 2018

(65) Prior Publication Data

US 2019/0001189 A1 Jan. 3, 2019

Related U.S. Application Data

(60) Provisional application No. 62/527,126, filed on Jun. 30, 2017.

(51) Int. Cl.
| | | |
|---|---|---|
| A63B 24/00 | (2006.01) | |
| G07C 1/22 | (2006.01) | |
| G06Q 10/06 | (2012.01) | |
| A63F 13/46 | (2014.01) | |
| A63F 11/00 | (2006.01) | |

(52) U.S. Cl.
CPC .......... A63B 24/0062 (2013.01); A63F 13/46 (2014.09); G06Q 10/0639 (2013.01); G07C 1/22 (2013.01); A63B 2024/0068 (2013.01); A63F 11/0051 (2013.01); A63F 2011/0058 (2013.01)

(58) Field of Classification Search
CPC ............ A63B 24/0062; A63B 69/0002; A63B 2220/30; A63B 2069/0006; A63F 13/46; G06Q 10/0639; G07C 1/22
See application file for complete search history.

(56) References Cited

U.S. PATENT DOCUMENTS

| | | | |
|---|---|---|---|
| 9,364,736 B1 * | 6/2016 | Saltzman | A63B 71/06 |
| 9,393,485 B2 | 7/2016 | Sullivan | |
| 2008/0026877 A1 * | 1/2008 | Neel | A63B 69/0002 |
| | | | 473/451 |
| 2013/0310958 A1 * | 11/2013 | Sanchez | A63B 24/0062 |
| | | | 700/91 |
| 2016/0214008 A1 * | 7/2016 | Heck | A63F 13/828 |
| 2016/0232807 A1 * | 8/2016 | Ghaffari | A61B 5/1118 |

(Continued)

OTHER PUBLICATIONS

Planet High School Baseball Pitch Count Management, Mar. 21, 2017.

(Continued)

*Primary Examiner* — William H McCulloch, Jr.
*Assistant Examiner* — Ankit B Doshi
(74) *Attorney, Agent, or Firm* — Fox Rothschild LLP

(57) ABSTRACT

A pitch count system monitors pitch count data for baseball and softball pitchers so that coaches, officials and team administrators can know when a team's pitcher is approaching or has reached pitch count limits. The system may register information upon game completion and/or enable live updating during game play, and may make updated pitch count information available to each team. The system may allow coaches to view their opponents' reports so that coaches can know who is not eligible to pitch against them on a certain day, or after a certain point in time as a game progresses. Further, the system may provide leagues and governing associations with an oversight mechanism to ensure that teams are adhering to the prescribed pitch count regulations.

20 Claims, 4 Drawing Sheets

(56) References Cited

U.S. PATENT DOCUMENTS

2016/0307335 A1* 10/2016 Perry ..................... G06T 7/292
2017/0080315 A1* 3/2017 Anglin ............... A63B 69/0002

OTHER PUBLICATIONS

Pitch Limit—C2C's Mobile Pitch Count Application/Software Documentation Forum/C2C Support Center, https://support.c2cschools.com/knowledge-bases/7/articles/1643-pitch-limit-c2cs-mobile-pitch-count-application, Jun. 29, 2018.

* cited by examiner

PITCHER STATISTICS TRACKING AND MONITORING SYSTEM

CROSS-REFERENCE TO RELATED APPLICATIONS

This application claims benefit of U.S. Provisional Application No. 62/527,126, filed on Jun. 30, 2017.

BACKGROUND

In baseball and softball, player injuries are unfortunately prevalent. In the case of pitchers, the injuries are often due to overuse of the player's arm. Baseball player arm surgeries, in particular, have surged due to coaches and players pushing the limits of what youthful arms are capable of safely handling.

To address this, baseball and softball leagues and governing bodies have developed regulations that limit the number of pitches that an individual player may throw over a time period, such as during a game or during a number of consecutive days. However, these regulations rely on conventional means of self-compliance and self-reporting. If a player or coach provides false numbers to the league, the pitch count limit can be rendered meaningless. In addition, coaches have no way to determine whether an opposing team is complying with pitch count limit requirements.

This disclosure describes a method and system directed to solving the problems described above.

SUMMARY

This disclosure describes a comprehensive pitch count system that monitors pitch count data for individual pitchers so that coaches can know when their team's pitchers are approaching or have reached pitch count limits, and when the pitchers will be available to pitch again. The system also allows coaches to view their opponents' reports so that they will know who is not eligible to pitch against them on a certain day, or after a certain point in time as a game progresses. Lastly, the system can provide leagues and governing associations with an oversight mechanism to help them ensure that teams are adhering to the prescribed pitch count regulations. As is apparent, the comprehensive pitch count system provides an unconventional means of solving the problems discussed above.

In various embodiments, the disclosure provides a pitch tacking system. The pitch tracking system may include a server that is in communication with a plurality of team electronic devices, in which the server comprises a processor, and a non-transitory computer-readable medium having recorded thereon programming instructions being executable by the processor to provide a pitch tracking application to the plurality of team electronic devices. The programming instructions may be configured to cause the processor to receive, from a first team electronic device, an identifier for a pitcher in a baseball game or a softball game and a first pitch count value for the pitcher for the game. The programming instructions may be configured to cause the processor to transmit the first pitch count value to a second team electronic device. The programming instructions may be configured to cause the processor to receive, from the second team electronic device, an indication of whether the second team electronic device user agrees with the first pitch count value. If the second team electronic device user agrees with the first pitch count value, the programming instructions may be configured to cause the processor to accept the first pitch count value and save the first pitch count value in association with a temporal parameter to a player profile for the pitcher. If the first pitch count value does not match a second pitch count value of the second team electronic device, the programming instructions may be configured to cause the processor to transmit a verification request message to at least the second team electronic device requesting verification of the first pitch count value; if the system receives an adjusted pitch count value from one of the team electronic devices within a threshold time frame and indicia of agreement with the adjusted pitch count value from the second team electronic device, the programming instructions may be configured to cause the processor to save the adjusted pitch count value in association with the temporal parameter to the player profile; and if the system does not receive an adjusted pitch count value within the threshold time period or indicia of agreement from the second electronic device, the programming instructions may be configured to cause the processor to perform an independent verification process to determine an audited pitch count value and save the audited pitch count value in association with the temporal parameter to the player profile.

In various embodiments, the programming instructions to perform the independent verification process may include instructions to determine whether the first team electronic device or the second team electronic device is associated with a home team; and determine the audited pitch count value as the pitch count value that is received from the home team electronic device.

In various embodiments, the programming instructions to perform the independent verification process may include instructions to send the first pitch count value and the second pitch count value to an administrator electronic device; query the administrator electronic device to provide the audited pitch count value; and receive the audited pitch count value from the administrator electronic device.

In various embodiments, the pitch tracking system may include additional programming instructions configured to cause the processor to, upon receiving an identifier for the pitcher: access the player profile for the pitcher and extract a historic pitch count value for the pitcher for a threshold period of time prior to a present time; determine a pitch capacity value representing a difference between a maximum value for the threshold period of time and the historic pitch count value for the pitcher; and transmit the pitch capacity value to the first electronic device or the second electronic device.

In various embodiments, the pitch tracking system may include additional programming instructions configured to cause the processor to generate and transmit an alert to at least one of the first electronic device, the second electronic device, and an administrator electronic device, based on the pitch capacity value being within a range of a maximum pitch count.

In various embodiments, the player profile for the pitcher may include data that includes at least one of a number of pitches thrown by the pitcher, a number of innings pitched by the pitcher, and a number of games in which the pitcher appeared.

In various embodiments, the player profile of the pitcher may be updated as the baseball game or the softball game progresses such that the first team electronic device and the second team electronic device receive a real time update of incremental pitch count values.

In various embodiments, the pitch tracking system may include additional programming instructions configured to cause the processor to retrieve pitch count data of one or more player profiles and generate a pitching report listing availability of pitchers.

In various embodiments, the processor may be configured to retrieve the pitch count data from at least one of a repository of the pitch tracking system and a third party repository.

In various embodiments, the processor may be configured to retrieve pitch count data for each team in which the pitcher pitches and generate a pitching report listing a pitch count of the pitcher for each team.

In various embodiments, the disclosure provides a non-transitory computer-readable medium having recorded thereon programming instructions being executable by a processor to provide a pitch tracking application to a plurality of team electronic devices. The programming instructions may be configured to cause the processor to receive, from a first team electronic device, an identifier for a pitcher in a baseball game or a softball game and a first pitch count value for the pitcher for the game. The programming instructions may be configured to cause the processor to transmit the first pitch count value to a second team electronic device. The programming instructions may be configured to cause the processor to receive, from the second team electronic device, an indication of whether the second team electronic device user agrees with the first pitch count value. If the second team electronic device user agrees with the first pitch count value, the programming instructions may be configured to cause the processor to accept the first pitch count value and save the first pitch count value in association with a temporal parameter to a player profile for the pitcher. If the first pitch count value does not match a second pitch count value of the second team electronic device, the programming instructions may be configured to cause the processor to: transmit a verification request message to at least the second team electronic device requesting verification of the first pitch count value; if the system receives an adjusted pitch count value from one of the team electronic devices within a threshold time frame and indicia of agreement with the adjusted pitch count value from the second team electronic device, save the adjusted pitch count value in association with the temporal parameter to the player profile; and if the system does not receive an adjusted pitch count value within the threshold time period or indicia of agreement from the second electronic device, perform an independent verification process to determine an audited pitch count value and save the audited pitch count value in association with the temporal parameter to the player profile.

In various embodiments, the programming instructions to perform the independent verification process may include instructions to: determine whether the first team electronic device or the second team electronic device is associated with a home team; and determine the audited pitch count value as the pitch count value that is received from the home team electronic device.

In various embodiments, the programming instructions to perform the independent verification process may include instructions to: send the first pitch count value and the second pitch count value to an administrator electronic device; query the administrator electronic device to provide the audited pitch count value; and receive the audited pitch count value from the administrator electronic device.

In various embodiments, the non-transitory computer-readable medium may include additional programming instructions configured to cause the processor to, upon receiving an identifier for the pitcher: access the player profile for the pitcher and extract a historic pitch count value for the pitcher for a threshold period of time prior to a present time; determine a pitch capacity value representing a difference between a maximum value for the threshold period of time and the historic pitch count value for the pitcher; and transmit the pitch capacity value to the first electronic device or the second electronic device.

In various embodiments, the non-transitory computer-readable medium may include additional programming instructions configured to cause the processor to generate and transmit an alert to at least one of the first electronic device, the second electronic device, and an administrator electronic device, based on the pitch capacity value being with a range of a maximum pitch count.

In various embodiments, the player profile of the pitcher may include data that includes at least one of a number of pitches thrown by the pitcher, a number of innings pitched by the pitcher, and a number of games in which the pitcher appeared.

In various embodiments, the player profile of the pitcher may be updated as the baseball game or the softball game progresses such that the first team electronic device and the second team electronic device receive a real time update of incremental pitch count values.

In various embodiments, the non-transitory computer-readable medium may include additional programming instructions configured to cause the processor to retrieve pitch count data of one or more player profiles and generate a pitching report listing availability of pitchers.

In various embodiments, the disclosure provides a pitch tracking system. The pitch tracking system may include programming instructions stored on a non-transitory computer-readable medium and configured to cause a server to serve a pitch tracking application to an electronic device. The programming instructions may cause the server to serve the application by receiving an identifier for a pitcher in a baseball game or a softball game and a first pitch count value for the pitcher. The programming instructions may cause the server to serve the application by accessing a player profile for the pitcher and extracting a historic pitch count value for the pitcher for a threshold period of time prior to a present time. The programming instructions may cause the server to serve the application by updating the historic pitch count value to account for the first pitch count value. The programming instructions may cause the server to serve the application by determining a pitch capacity value representing a difference between a maximum value for the threshold period of time and the updated historic pitch count value for the pitcher. The programming instructions may cause the server to serve the application by outputting the pitch capacity value to a user of the electronic device.

In various embodiments, the pitch tracking system may include additional programming instructions configured to cause the server to serve a pitch tracking application to the electronic device by generating and transmitting an alert to the electronic device, based on the pitch capacity value being within a range of a maximum pitch count.

DETAILED DESCRIPTION

Figure 1:
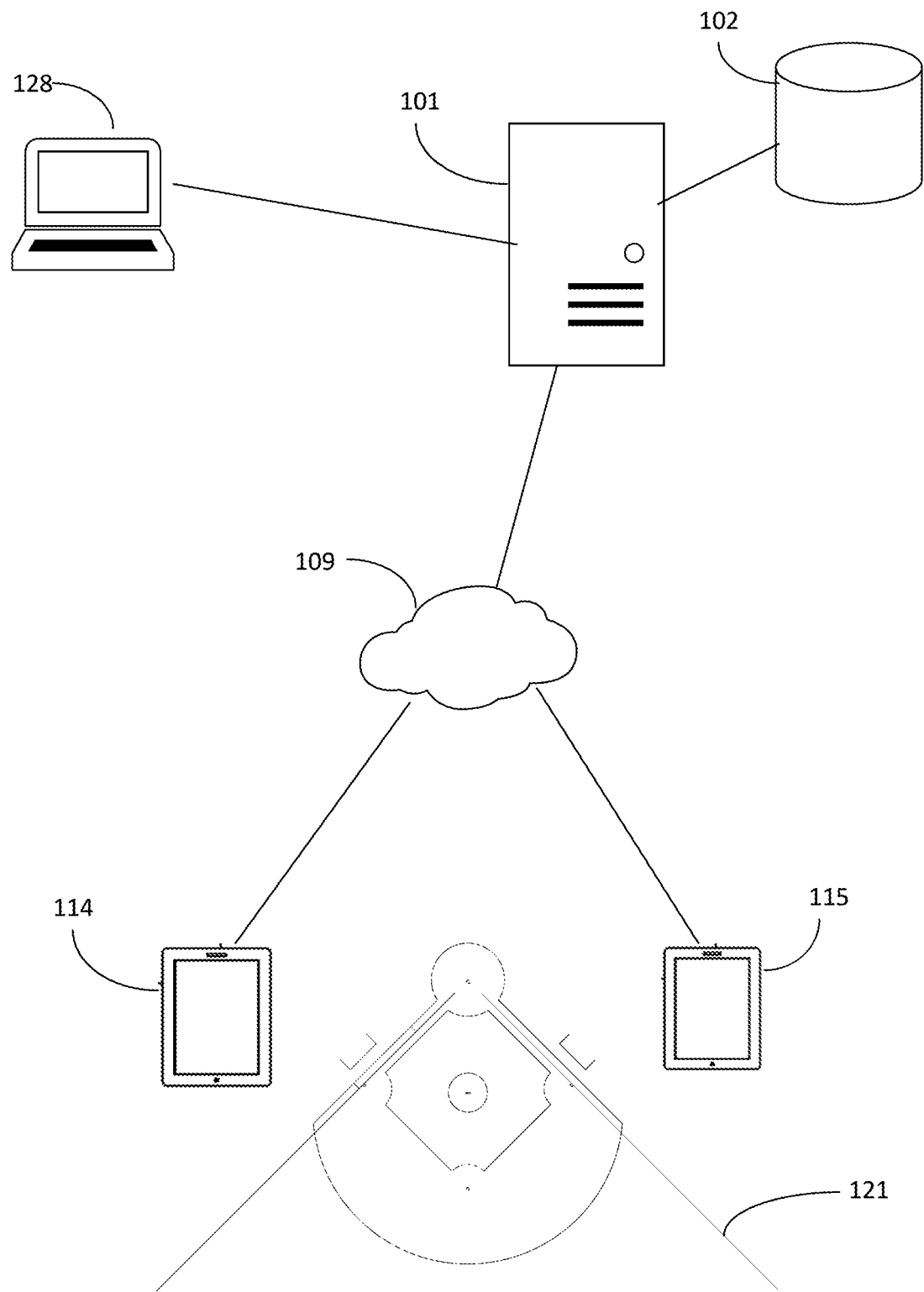
FIG. 1 illustrates example components of a player statistics monitoring system.

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

An "electronic device" or a "computing device" refers to a device or system that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine or container arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 3. Also, in this document, the phrase "team electronic device" refers to an electronic device that is being used by a coach, manager, scorekeeper or other authorized representative of a baseball team or a softball team (hereafter the embodiments of the disclosure are discussed in relation to baseball; however, it should be noted that these embodiments are equally applicable to softball).

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

In this document: (i) the term "comprising" means "including, but not limited to". The singular forms "a," "an," and "the" include plural references unless the context clearly dictates otherwise; and (iii) unless defined otherwise, all technical and scientific terms used in this document have the same meanings as commonly understood by one of ordinary skill in the art.

FIG. 1 illustrates an example set of components that may be included in the baseball or softball pitch tracking system (hereinafter "pitch tracking system"). A server 101 communicates with any number of electronic devices 114, 115 via one or more wired and/or wireless communication networks 109. The server 101 executes programming instructions that make a pitch tracking application available to the electronic devices 114, 115 via a client application installed on the electronic device, such as a web browser or a custom pitch tracking app. The server may include or be in electronic communication with a data store 102 that stores authorized user profiles (such as a username and access token), team profiles (which may include data such as team name, school or league names, pitcher names, and coach and/or manager names), and/or pitcher profiles. The pitcher profile for each pitcher may include data reflecting the pitcher's pitch history, such as a count of number of pitches thrown in a time period, number of innings pitched in the time period, and/or a number of games in which the pitcher appeared in a time period. Each of these data points for the pitcher may be associated with a temporal parameter, such as the time period or a date that the pitchers were thrown, a number of days ago that the pitcher threw the pitches, or cumulative data indicating a number of pitches thrown over a period of time.

The electronic devices 114, 115 may be used by a coach, manager, scorekeeper or other person associated with each of two baseball teams that are playing a game at a baseball field 121. Each electronic device 114, 115 may include a user interface (such as a touch screen, keyboard or keypad, or microphone) by which each team's authorized user may enter data about a pitcher's performance in a game, such as the pitcher's name or other identifier, number of pitches thrown, innings pitched, and other data. The electronic devices 114, 115 may wirelessly transmit this data to the server 101, or directly to each other, via one or more communication networks 109. The server 101 also may transmit to the electronic devices 114, 115 profile data about the opposing team's pitcher such as the number of pitches thrown within a recent threshold time period from the present date. The electronic devices 114, 115 may also include a display and/or audio output by which the authorized users of each team may access this data about the other team's pitcher. In this way, authorized users can enter pitching statistics for their pitchers, and retrieve statistics about the other team's pitchers, in real time at the ballfield during a baseball game 121.

In addition, one or more additional electronic devices 128 that are not located at the ballfield 121 may access and view data about pitching statistics for various pitchers and teams at any time.

The system described above may store team profile data for teams and leagues, and it may require authorized users to complete a verification process in order to access the system. This is done to ensure that appropriate individuals are using the system. When an authorized user registers with the system, the user will be associated with a team profile, which may include pitcher profiles and a maximum pitch count rule that indicates a number of pitches that a player is permitted to throw over a period of time, and/or a number of days' rest required between pitching outings.

The system may create a player profile for each player, with historical records indicating how many pitches that pitcher has thrown over a period of time. The system also may receive and monitor data for teams from different leagues—and governed by different pitch count requirements—and monitor each team's pitchers' compliance with their own applicable pitch count requirements. For example, if a Georgia-based team plays a Florida-based team, both teams can enter their pitch count data during the game and the system may use applicable Georgia pitch count maximum limits as the pitch count limit for the Georgia team, and applicable Florida pitch count maximum limits as the pitch count limit for the Florida team.

Figure 2:
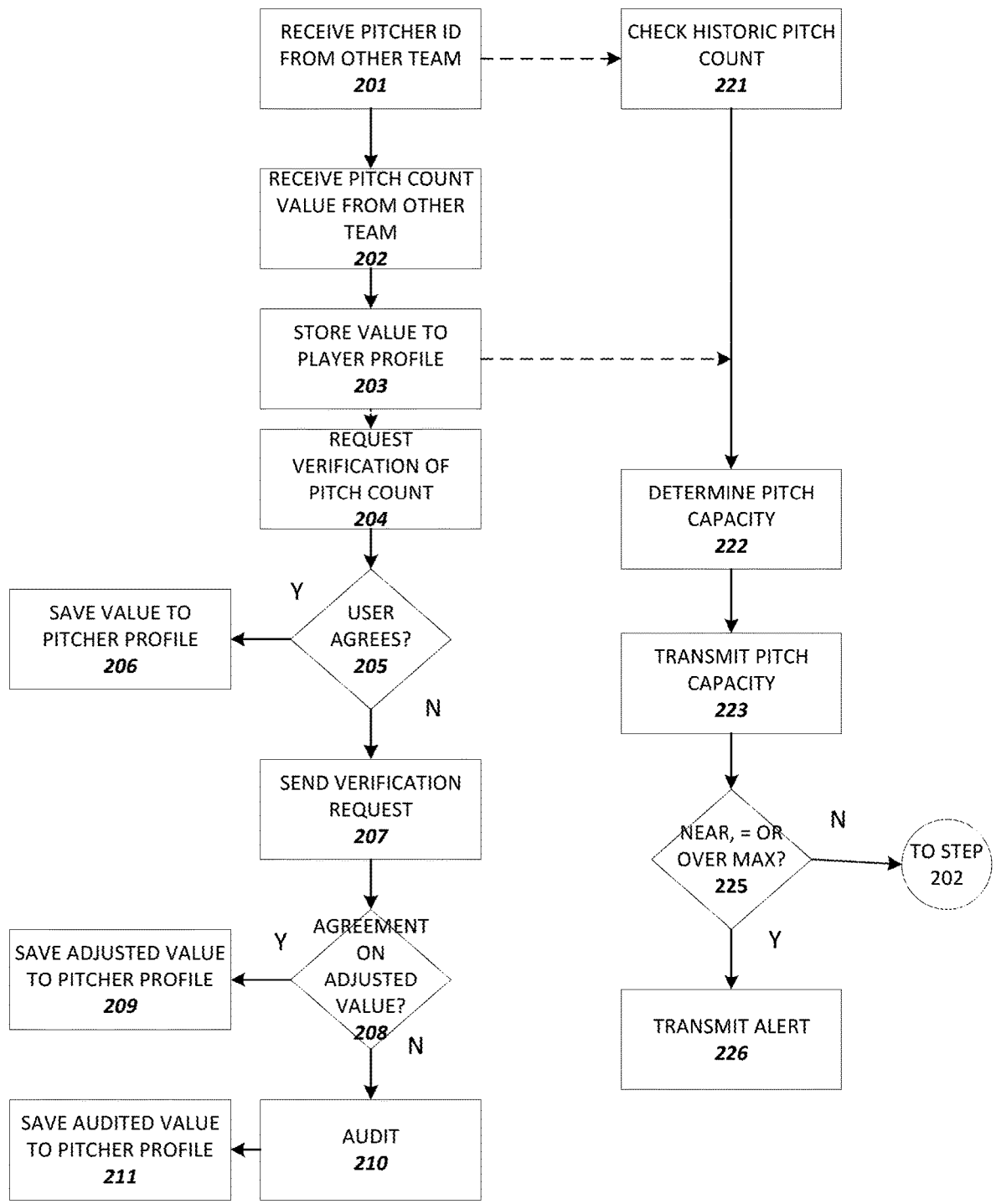
FIG. 2 illustrates an example process that a player statistics monitoring system may implement.

FIG. 2 is a flow diagram that illustrates an example process flow for the system and method described above. A first team electronic device will transmit, and a second team electronic device will receive, an identifier for a pitcher (step 201) and a first pitch count value (step 202) for the pitcher for a baseball game. The pitch count value may be an incremental value for pitches thrown as they occur, or at the end of a game segment (such as at each change in batter or at the end of the inning), or at the end of the game. The transmission may be directly from device to device via a local area network such as a Wi-Fi network, or the transmission may be indirect via a server that is in wireless communication with each of the teams' devices. Optionally, either of the team devices and/or the server may store indicia of pitch count values in a player profile for the pitcher (step 203). The storing step (step 203) may include the actual data received, and/or it may involve adding the pitch count value to an existing pitch count tally for the pitcher for a threshold time period. The storing step also may include storing the pitch count value or incrementing the tally in association with a temporal parameter, such as a date that the pitches were thrown, a date range within which the pitches were thrown, or another measurement of a time period within which the pitches were thrown. The system may receive the temporal parameter from the first team electronic device, or the system may generate the parameter as (or based on) the date on which the pitch count data is received.

At any point in the game, or after the game is completed, either team's electronic device will output a prompt that invites that team's user to verify the pitch count value of the other team's pitcher that was received from the other team's device (step 204). The user can then enter an indication of whether or not the user agrees with the other team's pitch count (step 205).

If the other team's user indicates that he or she agrees with the pitch count value, the system may accept the pitch count value and save the first pitch count value in association with a temporal parameter to a player profile for the pitcher (step 206).

If the other team's user does not agree with the pitch count value and/or the pitch count value of the other team's electronic device does not match with the pitch count value of the team's electronic device, the other team's electronic device may transmit a verification request message to the first team electronic device and/or the remote server requesting verification of the pitch count values (step 207). If the system receives an adjusted pitch count value from pitcher's team's electronic device within a threshold time frame and the non-pitching team indicates that it agrees with the adjusted value (step 208), the system may save the adjusted pitch count value in association with the temporal parameter to the player profile (step 209). If the system does not receive an adjusted pitch count value within the threshold time period from one of the team electronic devices that matches the pitch count value previously received from the other team electronic device, the system may perform an independent verification process (step 210) to determine an audited pitch count value, and the system may save the audited pitch count value in association with the temporal parameter to the player profile (step 211).

The system may perform any number of independent verification processes in the auditing step (step 210). For example, the server may determine whether the pitch count value was received from the home team by determining whether the first team electronic device or the second team electronic device is associated with a home team. This may have happened during the authorized user's logon process, or during a game initiation process in which the system requires each authorized user to indicate his or her home team. If so, the server may use the home team's pitch count value (i.e., the value received from the home team electronic device) as the audited pitch count value. Alternatively, the server may send the first pitch count value, and optionally also the second pitch count value, to an administrator electronic device, such as that of a governing body for the league, or that of an umpire who worked the game. The server may also query the administrator device to provide the audited pitch count value. The audited value may then be the value that the server receives from the administrator device.

Optionally, before the game or at any time during it, after receiving a pitcher identifier, either team's electronic device may access a local database or the remote server and retrieve historic pitch count data for the pitcher over a period of time (step 221), compare the historic pitch count data to a maximum threshold and determine a pitch capacity value as a difference between the maximum threshold and the historic pitch count data (step 222), and transmit the pitch capacity value to either or both of the team electronic devices (step 223). If the pitch capacity value is within a threshold range of a maximum pitch count (meaning that the capacity value is near a maximum, e.g. within 9 pitches, 15 pitches, 30 pitches, etc. of the pitcher's maximum pitch count) (step 225), the system may generate and transmit an alert (step 227) to at least one of the team electronic devices and an administrator or umpire electronic device. In addition, the system may determine pitch capacity values (step 222), transmit pitch capacity values (step 223), determine whether the value is approaching, equal to or over a max pitch capacity (step 225), and generate alerts as needed each time the server or a team device receives incremental pitch count values (step 202) and updates the player's profile data (step 203) in real time while the game progresses.

Figure 3:
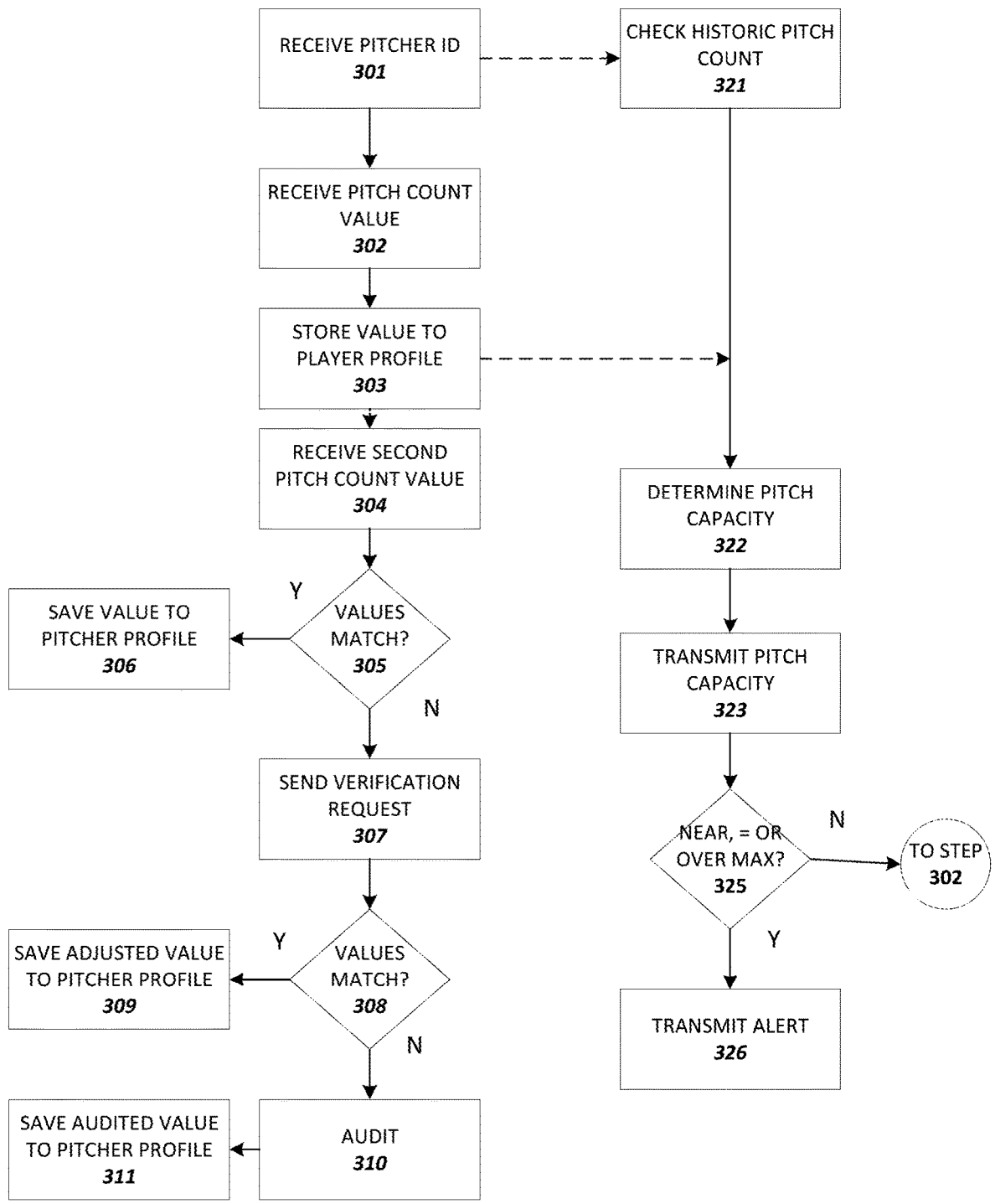
FIG. 3 illustrates an alternate process that a player statistics monitoring system may implement.

FIG. 3 is a flow diagram that illustrates an alternate process flow for the system and method described above. A first team electronic device may transmit, and a pitch tracking system server may receive, an identifier for a pitcher (step 301) and a first pitch count value (step 302) for the pitcher for a baseball game. The pitch count value may be an incremental value for pitches thrown as they occur, or at the end of a game segment (such as at each change in batter or at the end of the inning), or at the end of the game. The server may store indicia of pitch count values in the player's profile (step 303). The storing step (step 303) may include the actual data received, and/or it may involve adding the pitch count value to an existing pitch count tally for the pitcher for a threshold time period. The storing step also may include storing the pitch count value or incrementing the tally in association with a temporal parameter, such as a date that the pitches were thrown, a date range within which the pitches were thrown, or another measurement of a time period within which the pitches were thrown. The system may receive the temporal parameter from the first team electronic device, or the system may generate the parameter as (or based on) the date on which the pitch count data is received.

A second team electronic device may transmit, and the server may receive, a second pitch count value for the pitcher during the game (step 304). The server may then compare the first pitch count value to the second pitch count value to determine whether the values match (step 305).

If the values match, the system may accept the first pitch count value and save the first pitch count value in association with a temporal parameter to a player profile for the pitcher (step 306).

If the values do not match, the server may transmit a verification request message to the first team electronic device and the second team electronic device requesting verification of the pitch count values (step 307). If the system receives an adjusted pitch count value from one of the team electronic devices within a threshold time frame and the adjusted pitch count value matches the pitch count value previously received from the other team electronic device (step 308), the system may save the adjusted pitch count value in association with the temporal parameter to the player profile (step 309). If the system does not receive an adjusted pitch count value within the threshold time period from one of the team electronic devices that matches the pitch count value previously received from the other team electronic device, the system may perform an independent verification process (step 310) to determine an audited pitch count value, and the system may save the audited pitch count value in association with the temporal parameter to the player profile (step 311).

The system may perform any number of independent verification processes in the auditing step (step 310). For example, the server may determine which of the two pitch count values were received from the home team by determining whether the first team electronic device or the second team electronic device is associated with a home team. This may have happened during the authorized user's logon process, or during a game initiation process in which the system requires each authorized user to indicate his or her home team. If so, the server may use the home team's pitch count value (i.e., the value received from the home team electronic device) as the audited pitch count value. Alternatively, the server may send the first pitch count value and the second pitch count value to an administrator electronic device, such as that of a governing body for the league, or that of an umpire who worked the game. The server may also query the administrator device to provide the audited pitch count value. The audited value may then be the value that the server receives from the administrator device.

Optionally, before the game or at any time during it, after receiving a pitcher identifier, the server may retrieve historic pitch count data for the pitcher over a period of time (step 321), compare that historic pitch count data to a maximum threshold and determine a pitch capacity value as a difference between the maximum threshold and the historic pitch count data (step 322), and transmit the pitch capacity value to each of the team electronic devices (step 323). If the pitch capacity value is within a threshold range of a maximum pitch count (meaning that the capacity value is near a maximum) (step 325), the system may generate and transmit an alert (step 327) to the team electronic devices and/or an administrator or umpire electronic device. In addition, the system may determine pitch capacity values (step 322), transmit pitch capacity values (step 223), determine whether the value is approaching, equal to or over a max pitch capacity value (step 325), and generate alerts as needed each time the server receives incremental pitch count values (step 302) and updates the player's profile data (step 303) in real time while the game progresses. That is, as the baseball game progresses, the electronic devices of each team receive real time updates of the player profile for the pitcher or any subsequent pitcher who throws pitches during the game. As such, the pitch count on the scorecards for both teams playing the game are linked such that the coaches, book keepers, team managers, and/or players can verify the pitch count of their team and the opponent team and determine whether both teams are complying with pitch count requirements.

Therefore, in various embodiments, the pitch count management system may be employed via software and hardware that allows for the input of pitch count game data and then converts that data into team specific pitching reports in accordance to that team's particular athletic association's rules. The system may serve as an information management tool for coaches, officials, athletic associations and/or league administrators.

The pitch count management system is a hosted service, such as may be implemented on a private server, or via a cloud based software program. In some embodiments it may not require download of a specialized app. In other embodiments, a dedicated app may be employed to access the service. The service may be accessed by any type of electronic device that has access to a communication network such as the Internet access. The system may include a database of team and player names, along with state they play in and the athletic association with which they affiliate. When used by youth leagues and/or travel baseball teams/tournaments, the system may make the particular teams/leagues/tournaments and their associated rules available to coaches, officials and administrators via a user interface on each team's electronic device.

Coaches or team managers may request to claim the profile for a team, becoming the authorized user of the system for the team, from the pitch count management system website. As part of the team claim process, the user may be required to provide their name, the state they play in, the athletic association they are affiliated with, the name of their school, and a valid email address (such as a school system related email address) for themselves. The pitch count management system may access its profile data to determine whether the submitted data matches expected user profile data; if the submitted data does not match, the system's human staff may then research if the coach or administrator is actually the coach or administrator of the school/team that he or she is attempting to claim. Once the system determines that the user appears to be legitimate, a validation message may be sent via email or another messaging service to the user using the school system or other valid email address that was provided. Once validated, the user will complete the registration process to activate his/her account so that the user can then gain access to the system. When a state association agrees to implement this system as an official management system, this process may be streamlined by the athletic association providing a list of the school related email addresses of their coaches. Coaches may be sent a validation email from this information.

In claiming a team, the coach or administrator may create a unique username and password for his or her use. This same registration process is used by administrators of athletic associations, youth leagues, and travel baseball tournaments.

There may be different data input methods depending on how the system is used. When an athletic association uses the system as a comprehensive management tool, the two-team game report method will be used. If an athletic association is not using the system comprehensively, individual teams can utilize the system on their own. In this instance, teams may use the system as an internal tool and would be solely responsible for inputting accurate data for their team that is in accordance to the pitch count data accepted by their particular athletic association. These teams may use a single team game report and not necessarily share data with the opposing team in real time.

One method by which the system may enable data entry via electronic device user interfaces for the two-team game report embodiment is for an impartial pitch counter, for example, an umpire or official scorer, to input the game data. This embodiment may require an authorizing entity such as an athletic association to sign off on the fact that the individual(s) inputting the data are authorized to do so and that the authorizing entity may accept the data entered as valid. Once the pitch counter is authorized, the system may immediately accept data entered via an electronic device for which the pitch counter is logged in as valid. The system may then generate each team's pitching report using the data provided. In this method, the approved pitch counter may have a specific page that they are presented when logged into the system that gives the authorized pitch counter the ability to fill out a game report and submit it.

A second embodiment of data entry is a user interface page that enables coaches or team scorekeepers to input the data. In order to help ensure the accuracy of the pitch count data, the system may require each team's data entry person to go through a verification process of a peer to peer review. The home team's authorized user may fill out a two-team game report for both their team's pitchers/pitch counts and the opposing team's pitchers/pitch counts. The report may include other data such as the date of the game, the time of the game, the team names, the home state of each team, and the athletic association with which each team affiliates. Teams from different states or different athletic associations may play each other. The data also may include and the level of game play (e.g., varsity, sub-varsity or middle school). If an athletic association also wants to know what umpire association worked the game, this information may be made available as well.

When the home team's authorized user submits a game report to the system's server, the server then transmits a copy of some or all of the data in the game report to the visitor team's authorized user coach. The system may do this by displaying it on the visitor team's home page, on or another page accessible to the visitor team's authorized user. The visitor team's authorized user may be presented (on a display or via a messaging service) a notification that there is a pending game report that they need to view and verify. The visitor team's authorized user may be able to view the game report that the home team's authorized user submitted. If the visitor team's authorized user agrees that the data is accurate, the visitor team's authorized user may enter an indicia of agreement, such as by selecting a verify button on the user interface. In another embodiment, the process described above may occur in reverse, with the visitor team entering the game report, and the system receiving the data and sending that data to the home team.

If the visitor team's authorized user believes that something in the game report is inaccurate, then he or she may enter a notification of dispute. The system may present the user with a text box or menu by which the user can identify the information that he or she is disputing, along with the alternative information (such as an alternative pitch count). The disputed game report data may then be sent to the system server, which may resolve the dispute using procedures such as those described above in FIG. 2, for example by accepting the home team's report, or by comparing the data to an umpire's data and accepting the data that matches the umpire's data. The server also may send a notification to an administrator electronic device, such as that of an athletic association, league or tournament administrator, either by electronic messaging or by a notification on an administrative page dashboard alerting them that they need to review the game report data. The administrator may investigate the game and render a decision as to what the correct information is and submit or complete the final game report.

A third embodiment of data entry is by a single team's authorized user using a single team game report. In this embodiment, coaches or other team administrators may use the pitch count management system as an internal tool. The system then relies on the team's user to input accurate pitch counts that are in accordance with the official counts recognized by their athletic association, league, or tournament. The single team game report only requires the input of that team's information. The system may then use this data to update that same team's game report, which may include pitch count data each pitcher without requiring independent verification.

An alternative data entry embodiment may utilize the flexibility of the pitch count management system to pull or accept data from other recording systems. Through an application programming interface (API) or other suitable technology, the pitch count management system may pull data from other sites from which it is authorized to pull. For example, many state athletic associations are using third party services or their own website as the official repository of the pitch count data. The pitch count management system disclosed in this document may be able to accept this data and run each team's reports using this data. The system also may have the ability to accept data from third party electronic scorebook platforms.

An additional data entry embodiment is for the system's human administrative staff to have access to a pitch count repository (such as that of an athletic association) and manually input the pitch count data for each team.

In various embodiments, once pitch count data is entered and is accepted by the system as valid data, the system may then use that data to immediately generate an updated pitching report for that particular team(s). Each team's pitching reports may be date and/or time stamped so that coaches, team administrators and officials may be able to know whether they are viewing the most recent pitching report or not. Each time a team's home page is accessed, the system may run and update the pitching report if there is new data. In some embodiments, during the game, the system may receive the entered pitch count data, e.g., a number of pitches thrown by a pitcher, and the system may automatically populate the game report during the game as the system receives the pitch count data.

The pitching report may list at least two categories of players, such as: 1) those pitchers who are "unavailable"

because they have exceeded pitch count limits within a threshold time period, and 2) those pitchers who have "limited availability" because they will reach the applicable pitch count limit when they throw less than threshold number of pitches. The pitching report also may list pitchers who do not fall into either of the two categories listed above, or the report may not list such pitchers and if any pitcher that is not listed on the pitching report is available without restrictions. Those pitchers listed as unavailable also may have a date showing when they become available again so coaches can plan ahead. Players who have limited availability are those who are eligible to pitch on a particular day, but have less than a threshold number of pitches available, such as any number that is less than the maximum limit. The pitching report also may display how many pitches a limited availability player has left before reaching the pitch count limit. Each day, when a specific pitcher's next available date occurs, that player may drop off of the pitching report, or be displayed in an available category, since he/she is now available without restrictions.

The system may track daily or per game pitch count maximums. Moreover, the system may also track pitch count maximums over weekly, monthly, or any other period of time. By accounting for the pitches over a time period, for example, on a weekly basis, the system may alert individuals, such as coaches, through the pitching report of the number of remaining pitches a player can throw for the week, if the player is unavailable for the day, or if the player will have limited availability for the day. When the time period ends, such as when seven days passed, the system may automatically reset the pitch count for the player, even if the player still has to adhere to mandatory days of rest that are carrying over from the previous week.

The pitching report may be made up of pitchers from all levels of play within a school/program/organization/tournament and not a particular team level (varsity, junior varsity (JV), freshman, etc). Thus, a coach or other team administrator may know the exact status of pitchers across all levels of the school/program/organization/tournament. This is useful because pitch count regulations with mandatory days of rest apply at all levels. Thus, a JV pitcher who throws enough pitches to require three days of rest is not eligible to pitch in a varsity game until after three days of rest are completed. If the pitching report were segmented by team level (varsity, JV, freshman, etc.), then those JV pitchers wouldn't be listed on the varsity level pitching report and it would be possible for a JV pitcher to "fall through the cracks" and pitch in a varsity game when the pitcher is not supposed to. Thus, a check and balance process such as that provided by the pitch count management system may provide a pitching report of all varsity eligible pitchers on the same report.

In various embodiments, utilizing the unique identifier assigned to the pitcher, the system may update the pitching report for all teams the pitcher is assigned to or plays for when the pitcher pitches. The system may allow the player to pitch for more than one team, but be governed by one set of pitch count rules. For example, pitcher 1 may play for both Team 1 and Team 2. Pitcher 1 pitches for Team 2 on a Monday, and pitcher 1 has to rest for two days. The system updates the pitching report such that the report indicates for both Team 1 and Team 2 that pitcher 1 is unavailable until Thursday to pitch. If pitcher 1 plays with Team 1 on Wednesday, the coach of Team 1 will know that pitcher 1 is not available to pitch until Thursday.

In various embodiments, each team's home page may display the team's most recent pitching report so that the team may have immediate access to this information. In order to view the pitching report of their opponent, the system may provide a team search function where the one team's authorized user can access another team's pitching report. This may be a traditional search function, or by a menu such as a drop-down menu by which the user may select state, athletic association, and team in order to access the correct team's pitching report. Teams may have the ability to print this report or access it using a mobile device.

Each team's user interface also may display the team's current roster and enable the authorized user to add new players, archive players who are no longer playing and/or view current players to see their pitch count history over time. If a player has been archived previously, but now needs to be on the active roster, the user may access the player archives, find(s) the player he needs and adds him to the active roster. The user interface also may present team administrators with game reports that need to be verified (if the team administrators are inputting the data using the two-team report). The system also may provide users with access to an archive of game reports and pitching reports in case they need to see these past documents. If coaches or other team administrators are the ones inputting the data, they may access the game report using the user interface as well.

The system also may generate a user interface and present the user interface to state or other athletic associations, local youth leagues and baseball tournament organizers so that their authorized user may search for and access any of their affiliated teams' pitching reports. Such administrators also may be able to command the system to generate a cumulative pitch count report so they can see, in mass, all the pitchers who threw on a given day (or in another period of time) and the number of pitches thrown by each player. This collective pitch count report may be sortable by name, team or number of pitches thrown. These two functions give athletic associations and the like oversight tools to help ensure that teams are abiding by the rules and a mechanism to investigate pitcher eligibility complaints.

The system also may include a set of pitcher profiles for pitchers who are not affiliated with a particular team, or who may be affiliated with a particular team but are eligible to play for another team. If so, a user of a team electronic device may use the system to query the pitcher profile database for pitchers who are not affiliated with that user's team, but who are available to play for that team and who have at least a minimum number of pitches remaining before they reach their maximum pitch count. In this way, a team that needs extra pitching can use the system to identify and select an available pitcher, and also view that pitcher's remaining pitch count for the particular day of interest.

Additionally, many baseball or softball leagues allow a pitcher to exceed the pitch count maximum as long as the pitcher is removed at the conclusion of that at-bat. However, if the pitcher pitches to another batter or additional batters from the game after the at-bat in which the pitch count was exceeded, the pitcher is now pitching illegally. In various embodiments, the game report may include a selectable icon, for example a check box, to identify if a player, who exceeded the maximum pitch count, did so in a legal or illegal manner. For example, a coach, statistician, or another person maintaining the game report may check the box to indicate that the pitcher exceeded the pitch count in a legal manner. The selected icon in the game report may be transferred to the daily pitching report that is provided to league administrators. The league administrators may easily review the pitching report to determine who pitched, how many pitches a pitcher threw, and whether a pitcher, who exceeded the pitch count maximum, in a legal or illegal manner. By providing an indicator on the game report of whether the pitch count was exceeded legally or illegally, the league administrators can drastically reduce their work load in researching every pitch count that was exceeded.

The embodiments discussed above provide comprehensive pitch count systems and methods that monitor pitch count limits and may prevent coaches and ball players from falsifying pitch count numbers.

Figure 4:
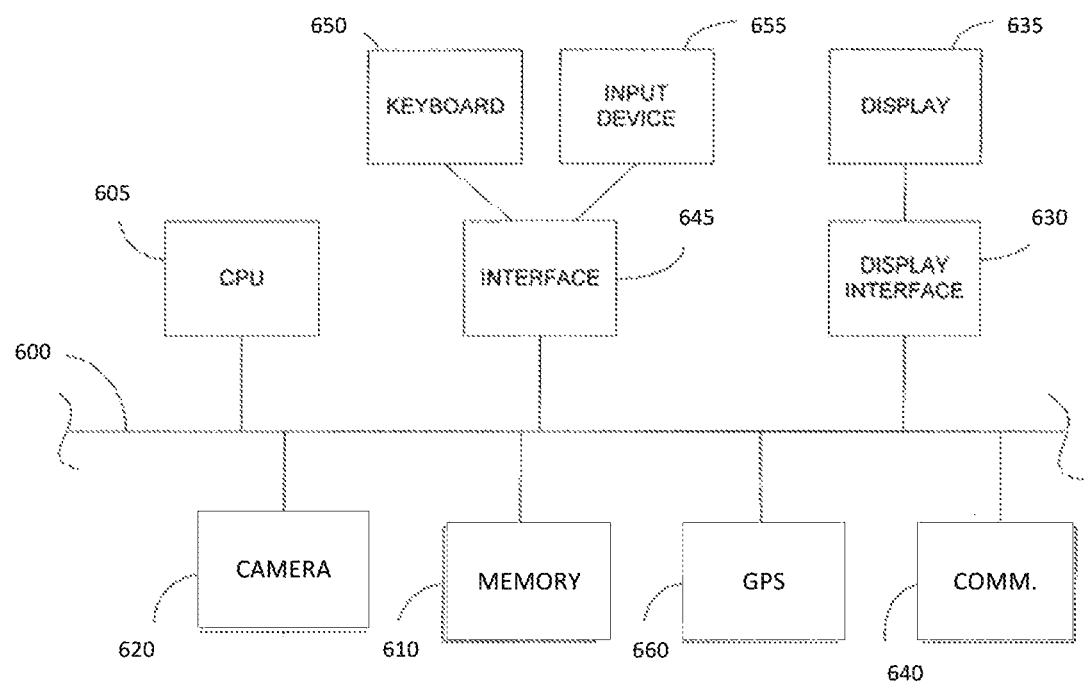
FIG. 4 illustrates example components of an electronic device.

FIG. 4 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 600 serves as an information highway interconnecting the other illustrated components of the hardware. The bus may be a physical connection between elements of the system, or a wired or wireless communication system via which various elements of the system share data. Processor 605 is a processing device of the system performing calculations and logic operations required to execute a program. Processor 605, alone or in conjunction with one or more of the other elements disclosed in FIG. 4, is an example of a processing device, computing device or processor as such terms are used within this disclosure. The processing device may be a physical processing device, a virtual device contained within another processing device, or a container included within a processing device. The server 101 may include one or more processors, such as processor 605, and may be in communication with electronic devices 114 and 115.

A memory device 610, such as data store 102, is a hardware element or segment of a hardware element on which programming instructions, data, or both may be stored. Read only memory (ROM) and random access memory (RAM) constitute examples of memory devices, along with cloud storage services.

An optional display interface 630 may permit information to be displayed on the display 635 in audio, visual, graphic or alphanumeric format. Communication with external devices, such as a printing device, may occur using various communication devices 640, such as a communication port or antenna. A communication device 640 may be communicatively connected to a communication network, such as the Internet or an intranet.

The hardware may also include a user input such as a keyboard or keypad 650, or other input device such as a mouse, a touch pad, a touch screen, a remote control, a pointing device, or a video input device. The hardware also may include a microphone 655 for receipt of voice and other audio inputs. Data also may be received from an image capturing device 620 such as a digital camera or video camera. A positional sensor 660 may be included to detect position. Examples of positional sensors 660 include a global positioning system (GPS) sensor device that receives positional data from an external GPS network.

The features and functions described above, as well as alternatives, may be combined into many other different systems or applications. Various alternatives, modifications, variations or improvements may be made by those skilled in the art, each of which is also intended to be encompassed by the disclosed embodiments.

What is claimed is:
1. A pitch tracking system, comprising:
a server that is in communication with a plurality of team electronic devices, wherein the server comprises a processor; and
a non-transitory computer-readable medium having recorded thereon programming instructions being executable by the processor to provide a pitch tracking application to the plurality of team electronic devices, the programming instructions configured to cause the processor to:
access a player profile for a pitcher in a baseball or softball game and extract a historic pitch count value for the pitcher for a threshold period of time prior to a present time,
determine a pitch capacity value representing a difference between a maximum value for the threshold period of time and the historic pitch count value for the pitcher, and
transmit the pitch capacity value to a first electronic device or a second electronic device,
receive, from the first team electronic device, an identifier for the pitcher and a first pitch count value for the pitcher for the game,
transmit the first pitch count value to the second team electronic device,
receive, from the second team electronic device, an indication of whether a user of the second team electronic device agrees with the first pitch count value,
if the user of the second team electronic device-agrees with the first pitch count value, accept the first pitch count value and save the first pitch count value in association with a temporal parameter to a player profile for the pitcher, and
if the first pitch count value does not match a second pitch count value of the second team electronic device:
transmit a verification request message to at least the second team electronic device requesting verification of the first pitch count value;
if the system receives an adjusted pitch count value from either the first team electronic device or the second team electronic device within a threshold time frame and an indicia of agreement with the adjusted pitch count value from the second team electronic device, save the adjusted pitch count value in association with the temporal parameter to the player profile; and
if the system does not receive an adjusted pitch count value within the threshold time period or the indicia of agreement from the second electronic device, perform an independent verification process to determine an audited pitch count value and save the audited pitch count value in association with the temporal parameter to the player profile,
wherein the player profile of the pitcher is updated as the game progresses such that the first team electronic device and the second team electronic device receive real time updates of incremental pitch count values.
2. The pitch tracking system of claim 1, wherein the programming instructions to perform the independent verification process comprise instructions to:
determine a home team electronic device, wherein the determining includes determining whether the first team electronic device or the second team electronic device is associated with a home team; and determine the audited pitch count value as the pitch count value that is received from the home team electronic device.

3. The pitch tracking system of claim 1, wherein the programming instructions to perform the independent verification process comprise instructions to:
send the first pitch count value and the second pitch count value to an administrator electronic device;
query the administrator electronic device to provide the audited pitch count value; and
receive the audited pitch count value from the administrator electronic device.

4. The pitch tracking system of claim 1, further comprising additional programming instructions configured to cause the processor to generate and transmit an alert to at least one of the first electronic device, the second electronic device, and an administrator electronic device, based on the pitch capacity value being within a range of a maximum pitch count.

5. The pitch tracking system of claim 1, wherein the player profile for the pitcher comprises data that includes at least one of a number of pitches thrown by the pitcher, a number of innings pitched by the pitcher, and a number of games in which the pitcher appeared.

6. The pitch tracking system of claim 1, further comprising additional programming instructions configured to cause the processor to retrieve pitch count data of one or more player profiles and generate a pitching report listing availability of pitchers.

7. The pitch tracking system of claim 6, wherein the processor is configured to retrieve the pitch count data from at least one of a repository of the pitch tracking system and a third party repository.

8. The pitch tracking system of claim 6, wherein the processor is configured to retrieve the pitch count data for each team in which the pitcher pitches and generate the pitching report listing a pitch count of the pitcher for each team.

9. The pitch tracking system of claim 1, wherein the programming instructions are configured to further cause the processor to:
generate, for each of a first team and a second team, a pitching report, and
transmit the pitching report to the first team electronic device and the second team electronic device;
wherein the pitching report includes a list of available pitchers for the first team and for the second team.

10. The pitch tracking system of claim 9, wherein the pitching report further includes a pitch capacity for each pitcher in the list of available pitchers.

11. The pitch tracking system of claim 9, wherein the pitching report further includes a list of unavailable pitchers for the first team and for the second team.

12. The pitch tracking system of claim 11, wherein each unavailable pitcher in the list of unavailable pitchers is marked as having exceeded a pitch capacity.

13. A non-transitory computer-readable medium having recorded thereon programming instructions being executable by a processor to provide a pitch tracking application to a plurality of team electronic devices, the programming instructions configured to cause the processor to:
access a player profile for a pitcher in a baseball or softball game and extract a historic pitch count value for the pitcher for a threshold period of time prior to a present time;
determine a pitch capacity value representing a difference between a maximum value for the threshold period of time and the historic pitch count value for the pitcher; and
transmit the pitch capacity value to a first team electronic device or a second team electronic device;
receive, from the first team electronic device, an identifier for the pitcher and a first pitch count value for the pitcher for the game;
transmit the first pitch count value to the second team electronic device;
receive, from the second team electronic device, an indication of whether a user of the second team electronic device user agrees with the first pitch count value;
if the user of the second team electronic device agrees with the first pitch count value, accept the first pitch count value and save the first pitch count value in association with a temporal parameter to a player profile for the pitcher; and
if the first pitch count value does not match a second pitch count value of the second team electronic device:
transmit a verification request message to at least the second team electronic device requesting verification of the first pitch count value;
if the system receives an adjusted pitch count value from either the first team electronic device or the second-team electronic device within a threshold time frame and an indicia of agreement with the adjusted pitch count value from the second team electronic device, save the adjusted pitch count value in association with the temporal parameter to the player profile; and
if the system does not receive an adjusted pitch count value within the threshold time period or the indicia of agreement from the second electronic device, perform an independent verification process to determine an audited pitch count value and save the audited pitch count value in association with the temporal parameter to the player profile;
wherein the player profile of the pitcher is updated as the game progresses such that the first team electronic device and the second team electronic device receive real time updates of incremental pitch count values.

14. The non-transitory computer-readable medium of claim 13, wherein the programming instructions to perform the independent verification process comprise instructions to:
determine a home team electronic device, wherein the determining includes determining whether the first team electronic device or the second team electronic device is associated with a home team; and
determine the audited pitch count value as the pitch count value that is received from the home team electronic device.

15. The non-transitory computer-readable medium of claim 13, wherein the programming instructions to perform the independent verification process comprise instructions to:
send the first pitch count value and the second pitch count value to an administrator electronic device;
query the administrator electronic device to provide the audited pitch count value; and
receive the audited pitch count value from the administrator electronic device.

16. The non-transitory computer-readable medium of claim 13, further comprising additional programming instructions configured to cause the processor to generate and transmit an alert to at least one of the first electronic device, the second electronic device, and an administrator electronic device, based on the pitch capacity value being with a range of a maximum pitch count.

17. The non-transitory computer-readable medium of claim 13, wherein the player profile of the pitcher comprises data that includes at least one of a number of pitches thrown by the pitcher, a number of innings pitched by the pitcher, and a number of games in which the pitcher appeared.

18. The non-transitory computer-readable medium of claim 13, further comprising additional programming instructions configured to cause the processor to retrieve pitch count data of one or more player profiles and generate a pitching report listing availability of pitchers.

19. A pitch tracking system, comprising:
   programming instructions stored on a non-transitory computer-readable medium and configured to cause a server to serve a pitch tracking application to an electronic device by:
      receiving an identifier for a pitcher in a baseball or softball game and a first pitch count value for the pitcher;
      accessing a player profile for the pitcher and extracting a historic pitch count value for the pitcher for a threshold period of time prior to a present time;
      updating the historic pitch count value to account for the first pitch count value;
      determining a pitch capacity value representing a difference between a maximum value for the threshold period of time and the updated historic pitch count value for the pitcher; and
      outputting the pitch capacity value to a user of the electronic device,
      wherein the player profile of the pitcher is updated as the game progresses such that the electronic device receives real time updates of incremental pitch count values.

20. The pitch tracking system of claim 19, further comprising additional programming instructions configured to cause the server to serve a pitch tracking application to the electronic device by generating and transmitting an alert to the electronic device, based on the pitch capacity value being within a range of a maximum pitch count.

* * * * *